United States Patent [19]

Singhal

[11] Patent Number: 5,360,165
[45] Date of Patent: Nov. 1, 1994

[54] SPRAY PAINT NOZZLE AND NOZZLE SHROUD

[76] Inventor: Tara C. Singhal, P.O. Box 5075, Torrance, Calif. 90510

[21] Appl. No.: 951,777

[22] Filed: Sep. 28, 1992

[51] Int. Cl.⁵ .......................... B05B 1/28; B05B 9/01
[52] U.S. Cl. ................................ 239/122; 239/124; 239/288; 239/288.5
[58] Field of Search ................. 239/288, 288.3, 288.5, 239/120, 121, 122, 124, 601

[56] References Cited

U.S. PATENT DOCUMENTS

| | | | |
|---|---|---|---|
| 1,773,969 | 8/1930 | Dreyfus et al. | 239/601 |
| 2,267,451 | 12/1941 | Eweryd et al. | 239/110 |
| 4,252,276 | 2/1981 | Aprea et al. | 239/601 |
| 4,442,576 | 12/1983 | Saito et al. | 239/121 |
| 4,516,521 | 5/1985 | Szelagowski et al. | 239/288 |
| 4,563,840 | 1/1986 | Urakami | 239/124 |
| 4,600,149 | 7/1986 | Wakatsuki | 239/120 |
| 4,865,257 | 9/1989 | Bailey | 239/288.5 |
| 5,002,227 | 3/1991 | Ehrenberg | 239/290 |
| 5,028,002 | 7/1991 | Whitford | 239/120 |

FOREIGN PATENT DOCUMENTS 331141  8/1958  Switzerland .................. 239/121

Primary Examiner—Andres Kashnikow
Assistant Examiner—Christopher G. Trainor

[57] ABSTRACT

An atomized spray applicator nozzle and nozzle shroud, for applying spray fluid to a surface. The shroud captures the unused spray spillage and spray vapors and recycles it. The shroud and nozzle design makes precise application of the fluid to the surface possible.

18 Claims, 2 Drawing Sheets

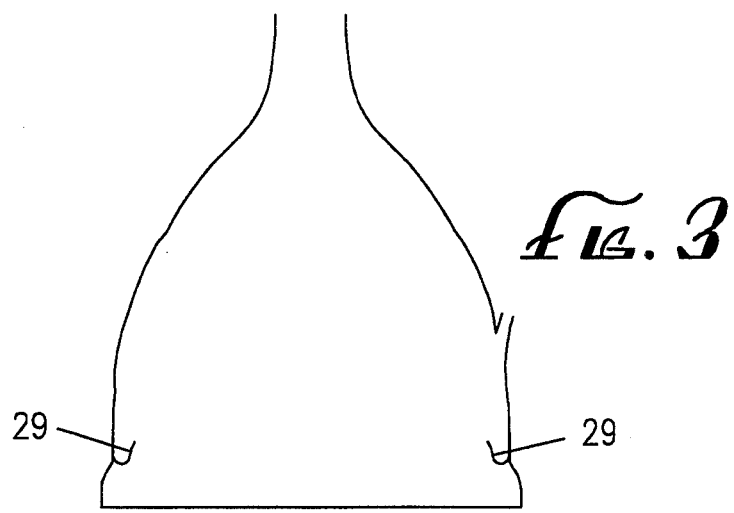
*fig.3*
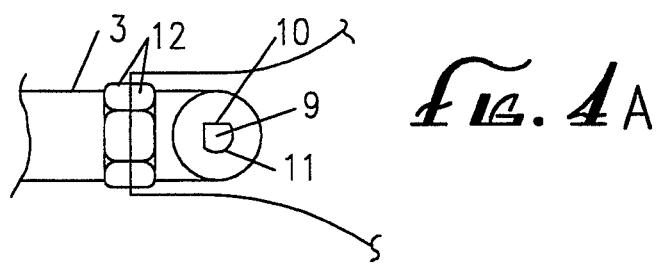
*fig.4*A
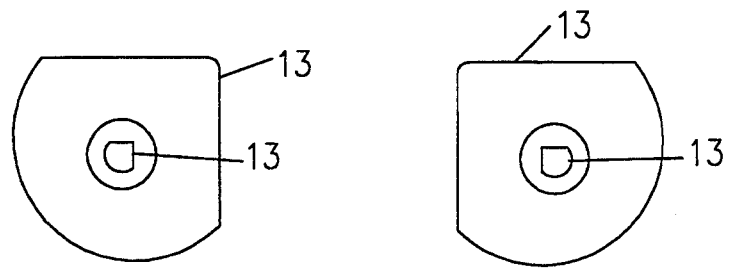
*fig.4*B   *fig.4*C
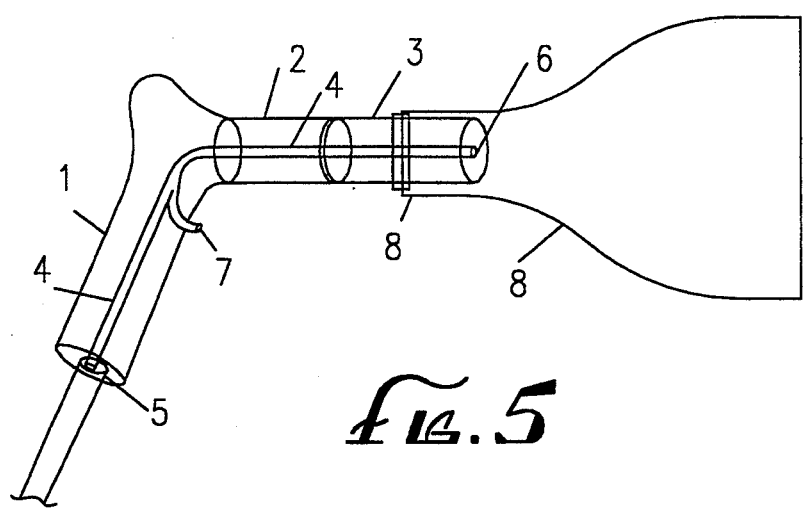
*fig.5*

SPRAY PAINT NOZZLE AND NOZZLE SHROUD

BACKGROUND OF THE INVENTION

1. Field of Invention

Hand held and other spray systems, where a stream of fluid such as paint, varnish or other fluids is atomized under pressure and then applied as a spray to a surface, suffers from some drawbacks. The first drawback is that the process of atomizing and spraying from the nozzle causes the fluid to be airborne and fall or spill in areas other than the surface to which the fluid is to be applied, making it a messy activity. Second drawback is that the atomized fluid, once it is airborne, causes environmental and health concerns as it causes the air in the general vicinity to be suffused with the fluid particles.

This invention is intended to provide solutions to these drawbacks in spray systems. The invention consists of a unique nozzle and a nozzle shroud. The shroud confines the airborne fluid's vapor and spillage to a closed volume of space and recapture it while the fluid was being spray applied to the surface.

2. Description of Related Art

None to my knowledge.

SUMMARY OF THE INVENTION

An atomized spray applicator nozzle and nozzle shroud, for applying spray fluid to a surface, that captures and recirculates the spray vapors and spray spillage and at the same time makes precise application of the fluid to the surface possible.

BRIEF DESCRIPTION OF THE DRAWINGS

FIG. 3. A view showing the u channel near the rim of the shroud.

FIG. 4a. Side view of a nozzle orifice and shroud.

FIG. 4b. Front view of a nozzle orifice and shroud.

FIG. 4c. Front view of another version of a nozzle orifice and shroud.

FIG. 5. A view of the sprayer nozzle.

DESCRIPTION OF THE PREFERRED EMBODIMENT

Figure 1:
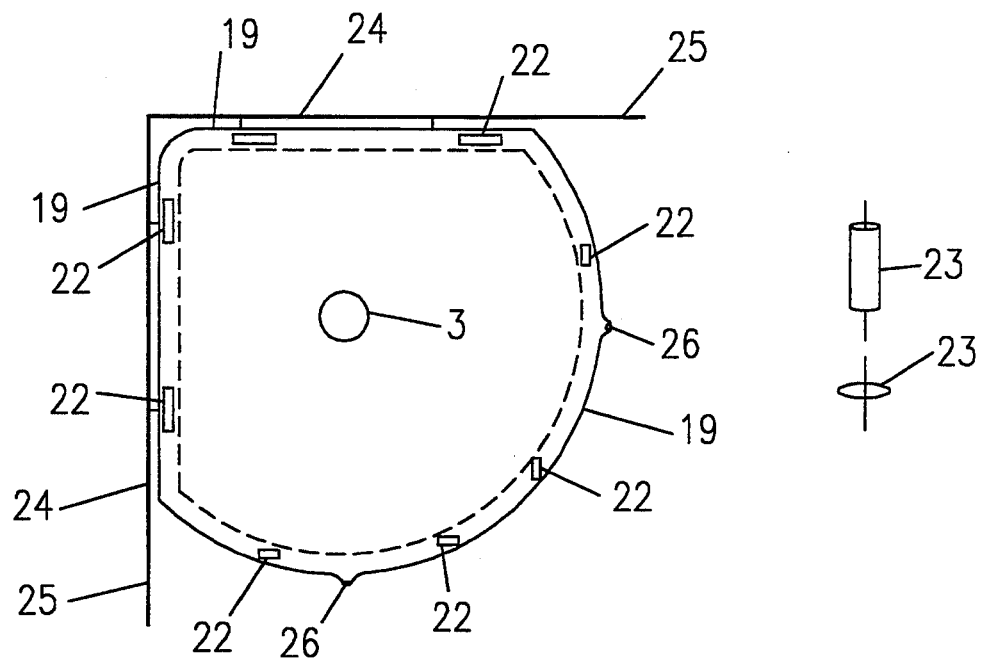
FIG. 1. Front view of the nozzle shroud.

Hand held and other Spray paint systems where a stream of fluid such as paint or varnish etc. is atomized under air pressure and then applied as a spray to a surface suffers from some drawbacks. The first drawback is that the process of atomizing and spraying from the nozzle causes the fluid to be airborne and fall in areas other than the surface to which the fluid is to be applied to making it a messy activity. Second, the atomized fluid once it is airborne causes environmental and health concerns as it causes the air in the general vicinity to be suffused with fluid particles.

This invention is intended to eliminate these problems in spray applications by a unique nozzle and a nozzle shroud. These nozzle and nozzle shroud would confine the airborne fluid to a closed space while the fluid was being applied to the surface and at the same time make a precise application possible.

This invention comprises three components: one, a nozzle; second, a shroud around the nozzle; and third, a recirculating mechanism in the shroud and the nozzle.

For the nozzle, refer to FIG. 5. Sprayer nozzle has three segments, viz. a nozzle handle or nozzle base segment (1), a nozzle fixed segment (2) and a nozzle rotatable segment (3). The rotatable segment is attached to the fixed segment, which is attached to the base segment. The rotatable segment, fixed segment and base segment have one continuous channel for flow of spraying fluid (4). Base segment has a spraying fluid inlet means to the channel (5). The rotatable segment has a spraying fluid exit means from the channel (6). The spraying fluid exit means consists of a fluid atomizing orifice. The rotatable segment is rotatable to any orientation on a 360 degree arc with respect to the fixed segment. The channel has an additional inlet opening in the base segment (7). The additional inlet opening is used for returning the spilled or airborne spray vapor to the spray fluid stream via the recirculating mechanism, as explained later.

There is a shroud around the nozzle, shaped like a funnel with a small and a large opening, to capture spray vapors. The rotatable segment of the nozzle has attachment means to receive, hold, and keep in place the shroud through its small opening, such that when the nozzle is held in hand by the nozzle handle, the shroud is attached to the nozzle and firmly held in place (8). The rotatable segment along with the shroud is rotatable with respect to the fixed segment.

Refer to FIG. 4. The orifice through which the atomized fluid is exited, instead of being, generally round or circular, creating a round shape spray pattern, is shaped similar to the large opening of the shroud. The shape is an arc and two straight edges at right angles (9). The fluid atomizing orifice has an orifice shape comprising of a combination of straight edges and an arc edge enabling the exiting spray pattern to match the large opening of the shroud. The straight edges consist of two edges at right angles, resembling the corner of a square (10). A circular arc edge closes the straight edges to provide a closed orifice (11).

Therefore, the nozzle orifice shape creates a pattern similar to the shape of the large opening of the shroud, thereby avoiding the unnecessary hitting of the inside of the shroud by the spray stream.

The nozzle also has means to lock the relative orientation of the shroud and the nozzle orifice, such that the spray pattern exiting from the nozzle orifice matches the shroud rim pattern (12). The nozzle also has means that would enable the shroud to be rotated in a 360 degree arc along with the nozzle orifice orientation, so that the position of the corner on the shroud's larger opening, and thereby the spray pattern, can be changed from left to right or top to bottom (13). This feature allows painting corners and edges on any side of the surface.

Figure 2:
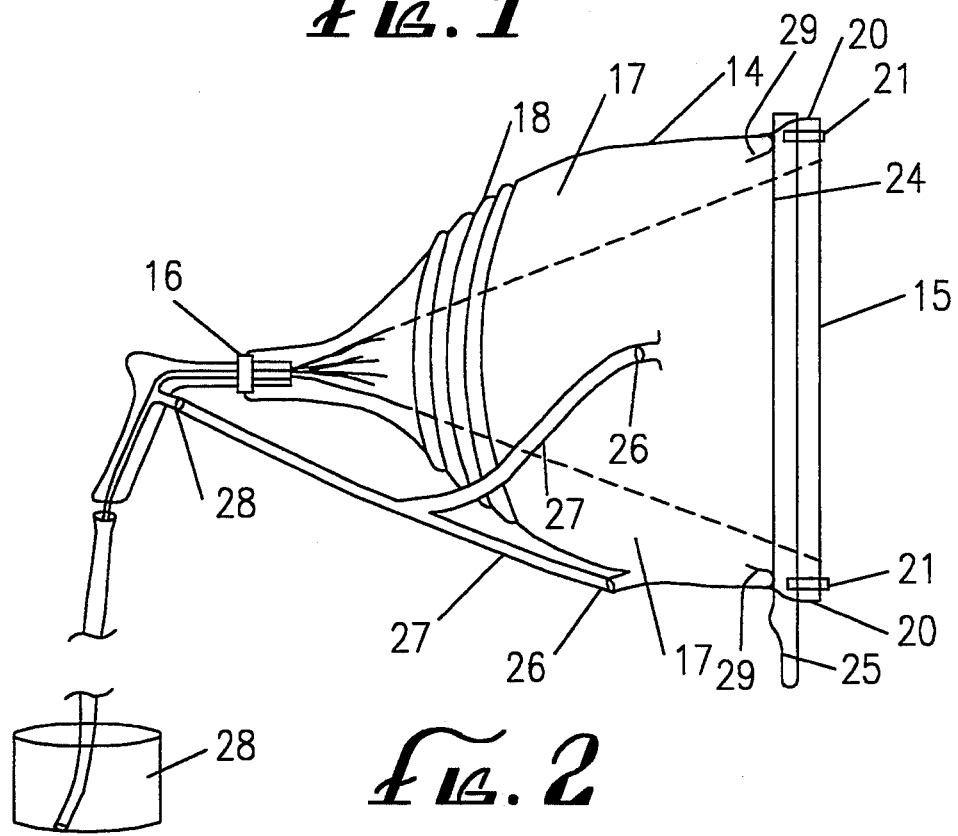
FIG. 2. Side view of the nozzle shroud showing shroud attached to a nozzle.

For the shroud, refer to FIGS. 1 and 2. The shroud is made of light weight material such as fiber-glass, plastic or other rigid/sturdy and light weight material. The shroud is shaped like a funnel and has two openings (14). One opening is a large opening, through which the spray is exited as it is applied on a surface (15). The other opening is a small opening through which the atomized spray fluid enters the shroud. This is also the opening through which the shroud is attached to the nozzle (16). The size of the large opening and the overall length of the shroud and the contour of the shroud is a function of the nozzle's spraying characteristics. These are therefore determined by the distance at which the nozzle is held from the surface to which the fluid is to be applied with and the size of the spray patch. There is extra volume of space around the funnel shape (17).

The rim of large opening has means enabling the large opening to be held at a fixed distance from the sprayable surface. The rim of large opening has means enabling the large opening to be slid across the surface to be sprayed. These are described later.

Some middle portion of shroud is made up of non rigid, flexible and light weight material. The non rigid material has segmentially foldable means enabling the overall length of shroud to be compressed (18). The segmental foldable means enable the nozzle orifice line to be slightly alterable from center line within the shroud, thereby allowing some tilt or play in the shape of the shroud. This allows the nozzle to be moved or tilted at a slight angle in a 360 degree fashion in relation to the shroud, so that as the shroud is moved side ways or up and down against a surface, maximum distance can be reached by the arm in applying the fluid. Also the tilt is used to assist in directing the fluid slightly to one or the other side in making clean edges of the fluid applied surface.

The shape of large opening of the shroud resembles the spray pattern shape from the nozzle orifice. The shape of the the large opening consists of one or a plurality of straight edges and one or a plurality of arc edges. For example, the edge or rim of the shroud at the large opening is shaped with an arc and two straight edges at right angles to each other (19). The part of the rim that consists of straight edges at right angles enables the shroud to form a clean corner and/or edge to the surface to be sprayed. This shape of the opening is intended to create straight line edges as the fluid is sprayed on the surface, and would assist in applying the fluid to surfaces that have corners or straight edge boundaries.

The rim of the shroud flares out a little and then straightens out (20). The extra space created by this flare out near the rim inside the shroud is occupied by set of rollers or wheels inside the rim (21). The rim of the shroud has tiny retractable rollers or wheels that enable the shroud to be rolled and slided, either horizontally or vertically, across a flat or other surface to which the fluid is to be applied (22). The pair of rollers that slide horizontally are retracted while the shroud is slided up and down, and other pair of rollers is retracted if it is slid side ways. Also coaster type wheel/rollers that slide in any direction can be used enabling the shroud to be slid in any direction. The tiny rollers provide only enough clearance between them and the extremity of the rim so that they will roll on the surface based on the surface texture. The shape, texture and design and material of the rollers is such that they would not mar or streak the surface to be sprayed with the fluid. One example of the roller material is rubberized rollers with spongy surface. The rollers could be the type that have a very thin rolling surface or a wide rolling surface (23). The size of the rollers is a function of the texture of the surface to be applied with. The rollers are spring loaded or mounted so that when rim is placed on surface, the clearance between the rim and the surface is as little as possible. A very smooth surface would require smaller rollers, where as a rough surface would require larger rollers.

The rollers/wheels can be placed either inside the rim of the large opening of the shroud as described above or outside the rim. In both placings of the rollers, they are protected from being in the path of spray stream. The rollers are detachable mounted to make removal, cleaning and installation easy and convenient.

Additional and optional means of making precise and straight edge to spray is made possible by using straight edge plates as follows. On the outside of the shroud near the rim on the straight edges, are attached thin and long sharp edge plates (24). These plates are generally the same length as the straight edges, on one side and a little longer on the other side (25). These plates are retracted or folded up on to the shroud. When they are to be used the plates are folded down, thereby making a precise right angle corner, or a precise straight edge, next to the right angle corner of the shroud rim. These plates are used to mark and make very clean edge boundaries of the fluid as it is applied to the perimeter of the surface.

The recirculation mechanism is made up of the following design features that aid in the recirculation. The shroud contour is shaped to provide extra volume of space, other than in a merely conical funnel shape, for isolating and then recirculating the vapors (17). At the middle of the shroud, approx. half way between the small and large opening and touching this extra volume of space, there are one or more openings from inside of the shroud to the outside of the shroud, ending in a small tube or nipple shape hole on the outside of the shroud (26). To these openings are attached plastic tubings (27). The other end of the tubings goes to the fluid container or to the additional inlet in the nozzle handle, to the channel, through which the spray is being applied. The tube from the fluid container feeding the atomized fluid to the nozzle has an opening to receive the tubings from the openings. The openings and the tubes are used to return the unused sprayed fluid spillage and resulting vapors to exit from the inside of the shroud and be cycled back to the fluid container (28). The natural air pressure and resultant back pressure of atomizing is used to help extract the spillage and vapors from the inside of the shroud. There could one or more such tiny opening on other parts of the circumference of the shroud, each either plugged or connected to tubing to exit the spray vapor and spillage.

Refer to FIG. 3. The inside of the shroud, near the rim and all around it, has a generally u shaped channel, whose opening faces the inside or the small opening of the shroud (29). This channel assists in capturing the over spray around the spray envelope, and returning it to the openings in the shroud for recycling the spray fluid via the tubing.

Therefore I claim:

1. A fluid spray system comprising:

(a) a sprayer nozzle comprising an atomizer for spraying fluid in the nozzle;

(b) a shroud attached around the sprayer nozzle, the shroud having apertures therein; and (c) a spray vapor and spillage capturing and recirculating mechanism in the shroud, the mechanism comprising:

(i) a U-Shaped channel attached to the shroud and positioned proximate to the apertures in the shroud, the U-shaped channel provided for capturing the spray vapor and spillage; and (ii) a plurality of tubes having one end connected to the apertures in the shroud and the other end connected to the nozzle, the tubes provided for returning spray vapor and spillage to the nozzle using the back pressure caused by the fluid spray system, wherein the shroud is sized sufficiently larger than the spray pattern from the atomizer to isolate and recirculate the spray vapor and spillage into the apertures in the shroud.

2. The fluid spray system of claim 1, wherein the sprayer nozzle further comprises a base segment, fixed segment, and rotable segment, the segments joined together and having a continuous channel therethrough, the channel provided for flow of spraying fluid therethrough, wherein the atomizer is attached to the rotable segment, and connected to the channel so that the atomizer is capable of spraying the fluid in the channel.

3. The fluid spray system of claim 2, wherein, the atomizer has an orifice having a shape comprising two straight edges joined to one another at right angles, with a circular arc edge joining the straight edges.

4. The fluid spray system of claim 3, wherein, the length and size of the shroud is such that the shroud is suitable for enclosing the spray from the atomizer.

5. The fluid spray system of claim 2, wherein, the shroud is attached to the rotable segment so that the shroud rotates with the rotable segment.

6. The fluid spray system of claim 2, wherein, the shroud further comprises foldable plates attached to the shroud, and wherein, when the foldable plates are folded down, the plates cause the spray from the atomizer to have substantially precise boundaries.

7. The fluid spray system of claim 1, wherein, a portion of the shroud is made from flexible material so that the shroud can be compressed.

8. The fluid spray system of claim 7, wherein, the portion of the shroud made from flexible material comprises foldable segments.

9. The fluid spray system of claim 1, further comprising sliding means for sliding the shroud against the surface to be sprayed.

10. The fluid spray system of claim 9, wherein, the shroud further comprises an outwardly extending rim, and wherein, the sliding means comprises:
    (a) springy supports attached to the rim; and
    (b) a plurality of rollers mounted on the springy supports for adjusting the distance between the shroud and the surface to be sprayed.

11. The fluid spray system of claim 10, wherein, the rollers have a spongy surface so that the rollers do not mar the sprayed fluid.

12. A fluid spray system comprising:
    (a) a sprayer nozzle comprising:
        (i) a base segment, fixed segment, and rotable segment, the segments joined together and having a continuous channel therethrough, the channel provided for flow of spraying fluid therein; and
        (ii) an atomizer attached to the rotable segment, the atomizer connected to the channel and capable of spraying the fluid in the channel, the atomizer having an orifice comprising two straight edges joined to one another at right angles, with a circular arc edge joining the straight edges;
    (b) a shroud attached around the sprayer nozzle, the length and size of the shroud being such that the shroud is suitable for enclosing the spray from the atomizer;
    (c) a spray vapor and spillage capturing and recirculating mechanism in the shroud; and
    (d) sliding means for sliding the shroud against the surface to be sprayed.

13. The fluid spray system of claim 12, wherein, the shroud further comprises foldable plates attached to the shroud, and wherein, when the foldable plates are folded down, the plates cause the spray from the atomizer to have substantially precise boundaries.

14. The fluid spray system of claim 12, wherein, a portion of the shroud is made from flexible material so that the shroud can be compressed.

15. The fluid spray system of claim 14, wherein, the portion of the shroud made from flexible material comprises foldable segments.

16. The fluid spray system of claim 12, wherein, the shroud further comprises one or more apertures in the shroud, and wherein, the spray vapor and spillage capturing and recirculating mechanism further comprises:
    (a) a U-shaped channel attached to the shroud and positioned proximate to the apertures in the shroud, the U-shaped channel provided for capturing the spray vapor and spillage overspray;
    (b) a plurality of tubes having one end connected to the apertures in the shroud and the other end connected to the channel within the nozzle, the tubes provided for returning spray vapor and spillage overspray to the channel using the back pressure caused by the fluid spray system.

17. The fluid spray system of claim 16, wherein, the shroud is sized sufficiently larger than the spray pattern from the atomizer to isolate and recirculate the spray vapor and spillage overspray into the apertures in the shroud.

18. The fluid spray system of claim 17, wherein, the shroud further comprises an outwardly extending rim, and wherein, the sliding means comprises:
    (a) springy supports attached to the rim; and
    (b) a plurality of rollers mounted on the springy supports for adjusting the distance between the shroud and the surface to be sprayed, the rollers having a spongy surface so that the rollers do not mar the sprayed fluid.

* * * * *